Nov. 17, 1936.  K. RÄNTSCH  2,061,088
ARRANGEMENT FOR THE COPYING BY PROJECTION OF LENTICULATED FILMS
Filed Nov. 10, 1934  2 Sheets-Sheet 1
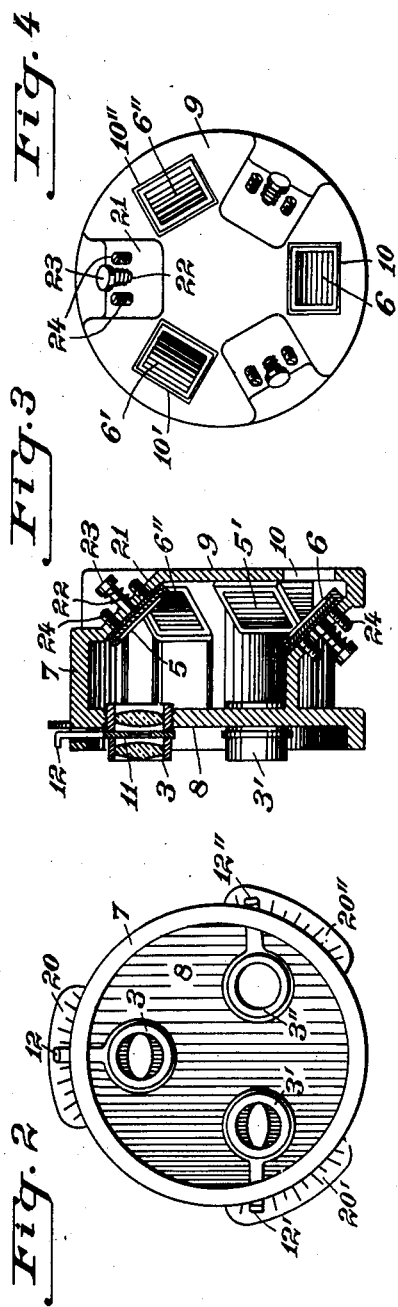
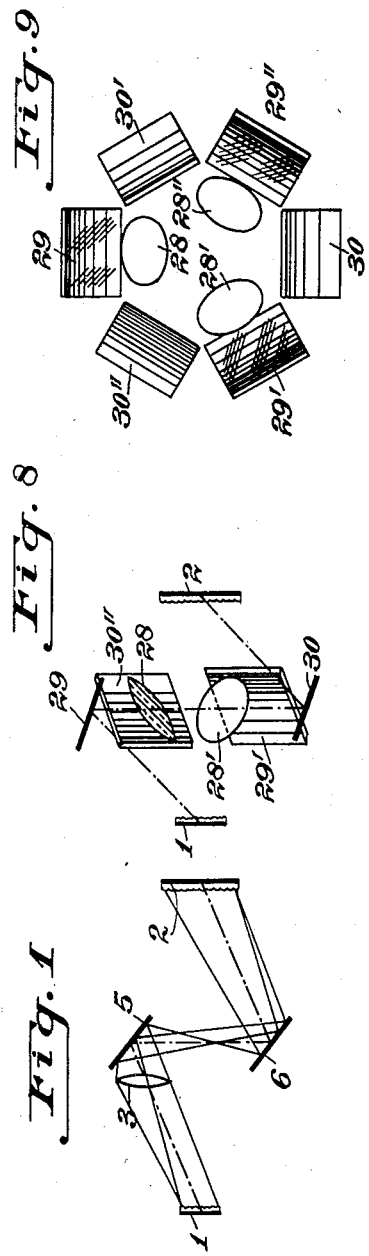
Inventor - Kurt Räntsch
By - Gifford, Scull & Burgess
Attorneys.

Nov. 17, 1936.   K. RÄNTSCH   2,061,088
ARRANGEMENT FOR THE COPYING BY PROJECTION OF LENTICULATED FILMS
Filed Nov. 10, 1934   2 Sheets-Sheet 2
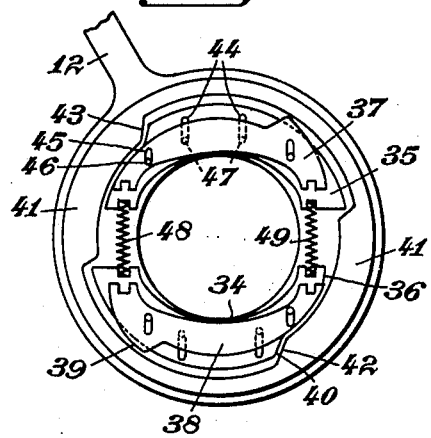
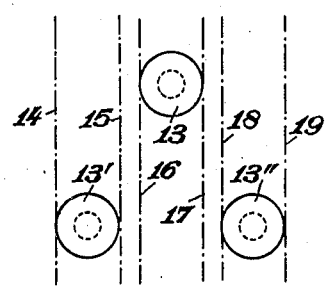
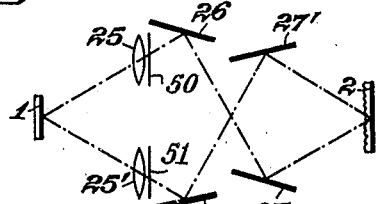
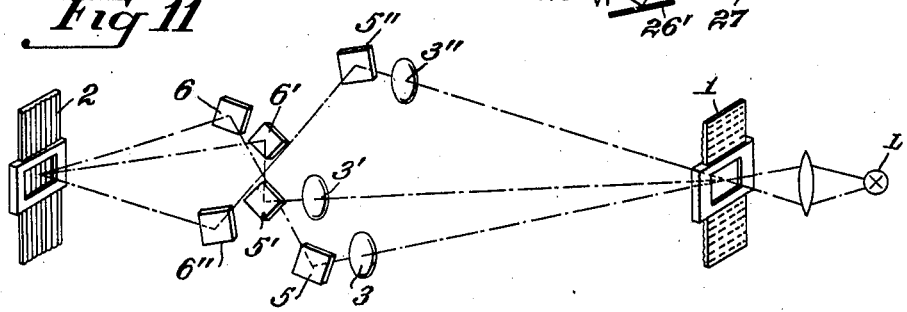
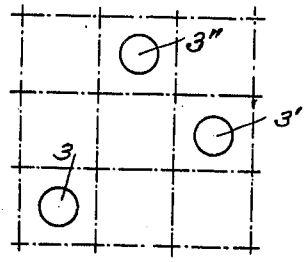

Patented Nov. 17, 1936

2,061,088

UNITED STATES PATENT OFFICE 2,061,088

ARRANGEMENT FOR THE COPYING BY PROJECTION OF LENTICULATED FILMS

Kurt Räntsch, Berlin-Teltow, Germany, assignor to Opticolor Aktiengesellschaft, Glarus, Switzerland, a corporation of Switzerland Application November 10, 1934, Serial No. 752,529
In Germany November 10, 1933

8 Claims. (Cl. 88—24)

This invention relates to improvements of such devices which are represented in my copending application Ser. No. 731,587, filed June 21, 1934, which refers to arrangements for the copying by projection of lenticulated films in which several optical systems serve simultaneously for the copying of one original film on one copy film. Generally a lenticulated film is used for the original and the copy. The new arrangements are however of importance also when either the original or the copy is a smooth, preferably multi-color film. If, for example, the original film is made as a smooth multi-color film, there must be arranged near or in the optical systems corresponding color filters for the purpose of making separately on the lenticular film the picture portions pertaining to the different colors. The same is true for the copying of a lenticular film on a smooth color film. On the contrary if the original and the copy are lenticulated films, no special means are necessary for the separation of the colors.

A specially advantageous constructional example consists according to the parent patent in that to each optical system there pertains a pair of mirrors that are parallel to each other. The light coming from the original film is reflected at the mirrors and passes through the optical system before it impinges upon the copy film. The optical system may be arranged for example between the mirrors.

Such an arrangement is considerably improved according to the present invention by inclining the plane mirrors to the axis of the pertinent optical system. It is thus brought about that the mirrors are used at an angle more favorable for a good image quality. If, in fact, the mirrors are arranged parallelly to the axes of the objectives, as in the case of the arrangement according to the parent patent, they must be very long and the smallest inequalities make themselves known in a very harmful manner. If, on the contrary, the mirrors are inclined to the optical axis, they can be smaller and the light effecting the copying impinges at a steeper angle so that the very finest inequalities are not harmfully noticeable.

Another important advantage that is attained by the invention is that all the optical means necessary for the making of the copies can be united in a smaller space. In particular, it is possible to unite the objectives and the mirrors in a holder in such a manner that the whole can be used like a single ordinary objective, although, it is true, only for one single rate of scale.

Although it is possible in arrangements according to the invention to use copying optical systems in which reflexion of the light occurs, still there are preferably employed purely dioptrically acting systems, and the invention will therefore be hereinafter by means of the drawings explained in respect of contructional examples in which the optical systems are made as objectives.

Fig. 1 is a diagrammatic view illustrating one form of the invention and taken along the longitudinal axis through the two films;

Fig. 2 is a view taken at right angles to the plane of Fig. 1 and showing the holder for three objectives;

Fig. 3 is a vertical sectional view through the structure shown in Fig. 2;

Fig. 4 is a view of the structure shown in Figs. 2 and 3 as seen from the right of Fig. 3;

Fig. 5 is a view on an enlarged scale taken on a plane parallel to that of Fig. 2 and showing the means for operating the diaphragms associated with one objective;

Fig. 5a is a side view of one of the shutter plates shown in the lower part of Fig. 5;

Fig. 5b is a side view of the other shutter plate shown in the lower part of Fig. 5;

Fig. 6 is a diagram taken on a plane parallel to that of Fig. 2 and illustrating certain features of the invention;

Fig. 7 is a view similar to Fig. 1 and showing an arrangement which may be used with two objectives;

Figs. 8 and 9 are diagrammatic showings of another form which the invention may take;

Fig. 10 is a view similar in some respects to Fig. 6 and illustrating another arrangement which may be used;

Fig. 11 is a diagrammatic view of an apparatus for practicing the invention according to Fig. 10.

In order to explain the principle of such an arrangement, in Fig. 1 between the original film 1 and the copy film 2 the objective 3 is arranged outside the connecting line of the middles of the two films. The two plane mirrors 5 and 6 which are parallel to each other are so arranged that the light from the original film passes through the objective and by way of the two mirrors to the film 2. If the pictures on the two films are of the same size the path of the rays from the film 1 to the objective must be just as long as the path of the rays from the objective by way of the mirrors to the film 2. The distance of the mirrors from the optical axis is moreover such that for example the main ray which issues from the middle of the film 1 at a given angle impinges on the film 2 at the same angle. By altering the angle which the mirrors make with the axis of the objective and by altering their distance the arrangement can be suited to different conditions. It is on the other hand also not necessary that the axis of the objective be parallel to the connecting line of the middles of the two films. This axis may also be inclined at any angle to the said connecting line. Care must be taken only that the films or the pictures thereof seen from the optical system be perpendicular to the optical axis.

Now for a complete copying arrangement for lenticular films several such objectives with pertinent pairs of mirrors are necessary. By means of the objective 3 with the two mirrors 5 and 6 there are copied for example only those picture portions that correspond to a single zone of the color filter used during the taking or reproduction. For each other zone there is preferably arranged in a suitable manner a like objective with a pair of mirrors.

The objectives are preferably located in one plane and may be arranged in such a manner that their optical axes are parallel to one another. They are, for example, placed in the corners of a regular polygon. Their number may be 2 or 3 or even more. The plane mirrors that pertain to each objective may either be arranged entirely on one side of the objective as shown in Fig. 1 or they may have the objective between them. In the latter case the axis of the objective is preferably perpendicular to the connecting line of the middles of the films. They may, however, make any desired other angle with this connecting line, but in this case the images of the film that are seen from the objective must be perpendicular to the optical axis.

A complete system is shown in Figs. 2 to 5.

Fig. 2 shows in elevation three objectives, 3, 3', and 3'', which are fastened in a common holder 7. Behind the objectives there are plane mirrors. Their arrangement may be seen from Fig. 3, which shows a section through the arrangement according to Fig. 2.

The casing 7 carries in its front surface 8 the three objectives 3, 3', and 3''. Behind the objective 3 the mirror 5 is fastened to the casing 7 in such a manner that the light that passes through the objective 3 is reflected, in the same manner as is shown diagrammatically in Fig. 1, on the mirror 6, which is likewise provided on the casing 7. The casing is closed by the rear wall 9 which has an opening 10 opposite to the mirror 6. In the same way behind the objective 3' and behind the objective 3'' there are arranged the mirror 5' and the mirror 5'' in such a manner that they are parallel to the mirrors 6' and 6'' respectively. The pairs of mirrors 5' and 6' and 5'', 6'' co-operate with the objectives 3' and 3'' respectively just as does the pair of mirrors 5 and 6 with the objective 3. Opposite to the mirrors 6' and 6'' there are likewise openings 10' and 10'' in the wall 9. An elevation of the surface 9 of the described arrangement is shown in Fig. 4.

For the purpose of explaining the mode of operation reference will be made to Fig. 6. The circles 13, 13', and 13'' made in this figure represent the apertures of the objectives seen from one of the films; from the film 1 these objective apertures are seen direct whilst from the film 2 they are seen by way of the pairs of parallel mirrors. The straight chain lines 14 to 19 are tangential to the circles 13, 13', and 13'' and are parallel to the cylindrical lens-elements on the films 1 and 2. The objectives are arranged in such a manner that the objective apertures shown in Fig. 6 are seen approximately in the same directions in which during the taking or projection zones of the multi-color filter are to be seen. The separating strips between the filter zones may consequently lie for example between the straight lines 15 and 16 and also 17 and 18. Also the filter zones may be located during the taking and/or projection in such a manner that they are seen approximately at the same places at which the surfaces located between the straight lines 14 and 15, the straight lines 16 and 17, and the straight lines 18 and 19 are to be seen from the films. It is then obvious that the three objectives cooperate just like a single large objective in the case of which however only three comparatively small openings are left free so that those places of the photographic layer that correspond to the separating strips between the filter zones are not also copied.

By screening off the objectives, 3, 3' and 3'' for example with an ordinary iris shutter, the picture portions pertaining to the different zones of the color filter can be copied with different intensities. Thereby, however, the separating strips between the zones—i. e., the distances between the straight lines 15 and 16 on the one hand, the straight lines 17 and 18 on the other hand, and finally also between the filter pictures located behind two adjacent grating-lenses—are simultaneously altered. As now in general the amount of these distances has an important influence on the quality of the color, it is frequently desired to have the possibility of screening off the objectives independently of one another without varying the width of the separating strips. For this purpose the objectives may be provided for example with elliptical shutters which are formed in such a manner that the objectives always remain completely open perpendicularly to the direction of the lens elements whilst the extension of the objective apertures can be adjusted parallelly to the lens elements. In the case of the objectives 3 and 3' of Fig. 2 there are shown two elliptical shutters which are closed to different extents. Such a shutter 11 is also shown in section in Fig. 3. For operating the shutters there serve the levers 12, 12' and 12'', which on the one hand embrace rotatable rings provided on the objective holder and on the other hand move over the scales 20, 20' and 20''.

The exact construction of such a shutter is shown enlarged in Figs. 5, 5a, and 5b. Fig. 5 shows a section through the objective 3, which is placed perpendicularly to the optical axis. The shutter consists of a number of plates having an elliptical opening. In the constructional example four such plates are provided. When the parts are in the position shown in Fig. 5 the objective is completely open so that the aperture is circular. On the shutter 34, by means of which the circular aperture is formed, there are placed two plates 35 and 36 which have an elliptical opening and can be moved downwardly and upwardly towards each other in such a manner that the free objective opening receives the form of an ellipse. This ellipse has a major axis equal to the diameter of the circular objective aperture whilst the minor axis is smaller than this diameter. On the plates 35 and 36 there lie also two other plates 37 and 38 which can likewise be moved towards each other in such a manner that an elliptical objective aperture results, the major axis of the ellipse being again equal to the diameter of the circle and the minor axis being smaller than in the case of the ellipse hereinbefore described.

Two such plates are shown separately in Figs. 5a and 5b. It will be seen that each of these is limited at its outer periphery by two circular arcs which have different radii. There are thus produced at the outer periphery on each plate noses 39 and 40 which are necessary for the adjustment of the shutter.

Around the plates there is placed, in fact, a ring 41. This has an opening composed of different circular arcs. In particular the form of this opening passes gradually at the places marked 42 and 43 from one circular arc into the other. When now the ring is turned the transition bears first against the nose 40 of the plate 33 and on the other side against the corresponding nose of the plate 35. Consequently the plates are on further rotation brought nearer together to such an extent that finally only an elliptical opening of the objective remains free. If further rotation takes place the noses of the plates 37 and 38 are engaged and these plates also are moved towards each other. For the purpose of rotating the ring 41 it is embraced by the handle 12.

In Figures 5, 5a and 5b it is also shown how by means of slots 44 and 45 and of flat pins 46 and 47 fitting in these slots it is brought about that the plates are always guided exactly straight. In order to bring it about that on the turning back of the ring the plates are again moved away from one another there are provided between the two plates 35 and 36 the springs 48 and 49. There are corresponding springs between the plates 37 and 38. For the sake of clearness they are omitted from the drawings.

When the size of the original film is to that of the copy film as 1:1, symmetrical objectives are preferably used. Three objectives of the same type are chosen and small deviations in the focal lengths are compensated for by giving suitable distances from one another to the pairs of inter se parallel mirrors. In order to enable the mirrors, on the exact adjustment of which much importance must be laid, to be accurately directed, there may be provided on the casing 7 inclined surfaces which have approximately the correct positions that are to be taken up by the mirrors. For the mirror 5 there is provided for example the inclined surface 21. On the rear surface of the casing holding the mirror there is fastened a pin 22 provided with a knob and there is provided a spring between the surface 21 and the knob 23 in such a manner that it pulls the mirror against the surface 21. For adjustment there are provided in the surface a number, for example three, of accurately adjustable adjusting screws 24, which press against the holder of the mirror 5. By adjusting the adjusting screws the distances of the mirrors from one another and from the objective and their angles can be varied in any desired manner. After adjustment the screws 24 are prevented by any known means from moving further. In exactly the same way the other mirrors are rendered adjustable.

Some other constructional examples are shown diagrammatically in Figs. 7 to 10. The exact constructional execution is similar to that of the arrangement according to Figs. 2 to 5.

In the case of the arrangement according to Fig. 7 the two objectives 25 and 25' are placed one over the other so that their axes are approximately parallel, and have the color filters 50 and 51, respectively, associated therewith. Behind the objective 25 there is the mirror 26, which makes a comparatively acute angle with the optical axis of the objective. The light reflected from this mirror is again reflected by the mirror 27, which is parallel to 26, and impinges upon the copy film 2. In a corresponding manner there are in the path of rays of the objective 25' the two mirrors 26' and 27', which are parallel to each other. By suitable dimensioning of the distance of the mirrors that are parallel to one another it is brought about that the images exactly coincide on the film 2. The greater inclination of the mirrors to the optical axis has the advantage that the rays between two mirrors parallel to each other are inclined to the optical axis so that the mirrors 26 and 26' on the one hand and the mirror 27 and 27' on the other hand can be arranged in planes which differ from one another and are perpendicular to the optical axes. It is thus rendered possible to work with two objectives that are diametrical to one another. This is of importance inasmuch as for example in the case of the copying of lenticular films on which only two component pictures are united, for example in the case of a stereoscopic film or in the case of a two-color process, an objective can be provided for each component picture. Also there may be provided in corresponding manner, three, four or more objectives, which are preferably arranged in the corners of a regular polygon.

For the case of three objectives an arrangement according to Fig. 10 may however be of importance. When, namely, it is a question of copying one lenticular film on another of which the direction of elements is at right angles to the direction of the elements on the first film, the objectives must be arranged in such a manner that they are seen from each film in directions in which during the taking or reproduction zones of the color filter are to be seen. In Fig. 10 it is indicated for example by the vertical straight lines where approximately the lateral limiting lines of the zones of the taking filter were seen from the original film. The horizontal straight lines indicate correspondingly the lateral edges of the filter zones during the reproduction. The arrangement of the objectives may be approximately described by saying that the figure is made as a chessboard consisting of nine squares, one objective is arranged in one corner, and the two other objectives are arranged in such a manner that they can be reached from the first objective by a knight's move. It is also to be noted, however, that with such a copying method the color of one edge zone is substituted for the color of the middle zone. Moreover, such an arrangement is independent of whether the axes of the objectives are parallel to one another, whether they are inclined to one another, or whether they are located in one plane as in the case of the arrangement represented in Fig. 9. Also it is immaterial whether the mirrors are located only on one side of the objectives or on both sides and whether they are inclined more or less to the optical axes.

In Fig. 11 is shown an arrangement of the kind just referred to, wherein films 1 and 2 are the original and the copy films, respectively, having their lenticulations disposed at right angles to each other, as plainly indicated. The three beams of light corresponding respectively to the three colored filter zones are carried from the original to the copy film through the objectives 3, 3' and 3" and the mirrors 5, 5' 5" and 6, 6' and 6", respectively. The relation of the three objectives to each other is indicated likewise in Fig. 10. The light for projecting the picture from the original film 1 to the copy film 2 may be supplied by a source of light L, and the center line of the beams of light passing through the two objectives and associated mirrors are indicated in dot and dash lines.

In Figs. 8 and 9 there is represented for example an arrangement in which each objective is arranged between two mirrors that are parallel to one another. Fig. 8 shows a section which is made through the connecting line of the two film middles, whilst Fig. 9 shows an elevation. The objective 28, 28', and 28'' are arranged in the corners of an equilateral triangle. The light coming from the original film 1 is reflected by the mirrors 29 in such a manner that it passes through the objective 28 and is reflected at the mirror 30 which is parallel to 29, in the direction to the film 2. Corresponding pairs of mirrors 29', 30', and 29'', 30'' pertain to the objectives 28' and 28'' respectively.

The axes of the objectives are inclined with respect to the connecting line of the film middles by such an angle that the images of the films seen from an objective are perpendicular to the axis of such objective.

It ought also to be emphasized that the arrangements according to the invention may be employed not only for films with cylindrical lenticular elements but also for films with spherical ones.

What I claim is:

1. In combination, an original and a copy film, one of said films having thereon a multiplicity of lenticulations behind each of which a group of color records is formed, and means for projecting from the original film to the copy film a plurality of beams of light corresponding in number to the number of color records in a group, the means for thus projecting each beam comprising a lens and a pair of mirrors parallel to each other but disposed at a substantial angle to the axis passing through the centers of the two films.

2. In combination, an original and a copy film, one of said films having thereon a multiplicity of lenticulations behind each of which a group of color records is formed, means for projecting from the original film to the copy film a plurality of beams of light corresponding in number to the number of color records in a group, the means for thus projecting each beam comprising a lens and a pair of mirrors parallel to each other but disposed at a substantial angle to the axis passing through the centers of the two films, and the means for projecting one beam being independent of those for projecting other beams.

3. In combination, an original and a copy film, one of said films having thereon a multiplicity of lenticulations behind each of which a group of color records is formed, and means for projecting from the original film to the copy film a plurality of beams of light corresponding in number to the number of color records in a group, the means for thus projecting each beam comprising a lens and a pair of mirrors both on the same side of said lens and parallel to each other but disposed at a substantial angle to the axis passing through the centers of the two films.

4. In combination, an original and a copy film, one of said films having thereon a multiplicity of lenticulations behind each of which a group of color records is formed, means for projecting from the original film to the copy film a plurality of beams of light corresponding in number to the number of color records in a group, the means for thus projecting each beam comprising a lens and a pair of mirrors both on the same side of said lens and parallel to each other but disposed at a substantial angle to the axis passing through the centers of the two films, and the means for projecting one beam being independent of those for projecting other beams.

5. In combination, an original and a copy film, one of said films having thereon a multiplicity of lenticulations behind each of which a group of color records is formed, and means for projecting from the original film to the copy film a plurality of beams of light corresponding in number to the number of color records in a group, the means for thus projecting each beam comprising a lens and a pair of mirrors on opposite sides of the lens parallel to each other but disposed at a substantial angle to the axis passing through the centers of the two films.

6. In combination, an original and a copy film, one of said films having thereon a multiplicity of lenticulations behind each of which a group of color records is formed, means for projecting from the original film to the copy film a plurality of beams of light corresponding in number to the number of color records in a group, the means for thus projecting each beam comprising a lens and a pair of mirrors on opposite sides of the lens parallel to each other but disposed at a substantial angle to the axis passing through the centers of the two films, and the means for projecting one beam being independent of those for projecting other beams.

7. In combination, an original and a copy film, one of said films having thereon a multiplicity of lenticulations behind each of which a group of color records is formed, means for projecting from the original film to the copy film a plurality of beams of light corresponding in number to the number of color records in a group, the means for thus projecting each beam comprising a lens and a pair of mirrors parallel to each other but disposed at a substantial angle to the axis passing through the centers of the two films, and said lenses, as viewed along said axis, being disposed at corners of a polygon.

8. In combination, an original and a copy film, one of said films having thereon a multiplicity of lenticulations behind each of which a group of color records is formed, means for projecting from the original film to the copy film a plurality of beams of light corresponding in number to the number of color records in a group, the means for thus projecting each beam comprising a lens and a pair of mirrors parallel to each other but disposed at a substantial angle to the axis passing through the centers of the two films, the means for projecting one beam being independent of those for projecting other beams, and adjustable diaphragms associated with said lenses.

KURT RÄNTSCH.